US008605295B2

(12) United States Patent
Potin et al.

(10) Patent No.: US 8,605,295 B2
(45) Date of Patent: Dec. 10, 2013

(54) OPTICAL REFLECTOR HAVING SEMI-REFLECTIVE BLADES FOR A POSITION DETECTION DEVICE FOR A HELMET, AND HELMET COMPRISING SUCH A DEVICE

(75) Inventors: Laurent Potin, Coutras (FR); Siegfried Rouzes, Le Haillan (FR); Jean-Pierre Gerbe, Pessac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/513,856

(22) PCT Filed: Dec. 2, 2010

(86) PCT No.: PCT/EP2010/068749
§ 371 (c)(1),
(2), (4) Date: Jun. 4, 2012

(87) PCT Pub. No.: WO2011/067341
PCT Pub. Date: Jun. 9, 2011

(65) Prior Publication Data
US 2012/0236321 A1    Sep. 20, 2012

(30) Foreign Application Priority Data

Dec. 4, 2009 (FR) .................................... 09 05866

(51) Int. Cl.
*G01B 11/14* (2006.01)
(52) U.S. Cl.
USPC ........................................ 356/614; 356/615
(58) Field of Classification Search
USPC ............ 356/614–624, 138–139.01, 492, 508, 356/152; 250/203.2, 206.2, 203.1, 201.1, 250/206.1, 206
See application file for complete search history.

(56) References Cited

U.S. PATENT DOCUMENTS

| 3,374,044 A | | 3/1968 | Benson |
| 5,208,641 A | * | 5/1993 | Mocker et al. ............... 356/5.09 |
| 5,388,059 A | | 2/1995 | DeMenthon |

FOREIGN PATENT DOCUMENTS

| EP | 0 294 101 A2 | 12/1988 |
| FR | 2 488 396 A1 | 2/1982 |
| GB | 2 301 968 A | 12/1996 |

OTHER PUBLICATIONS

PCT International Search Report for PCT Counterpart Application No. PCT/EP2010/068749 with full English translation, 7 pgs (Jan. 27, 2011).
Written Opinion of the International Search Authority for PCT Counterpart Application No. PCT/EP2010/068749 with full English translation, 10 pgs. (Jun. 5, 2012).
PCT Notification of Transmittal of IntemAtional Preliminary Examination Report for PCT Application No. PCT/EP2010/068749 with full English translation, 13 pgs. (Jun. 4, 2012).

* cited by examiner

*Primary Examiner* — Tri T Ton
(74) *Attorney, Agent, or Firm* — Blakely, Sokoloff, Taylor & Zafman LLP

(57) ABSTRACT

The general field of the invention is that of optical position/orientation devices for a helmet and more particularly those whose helmet comprises neither emitters, nor receivers but solely passive optical components, detection of which is ensured by fixed opto-electronic means outside the helmet. The optical component for the optical device for detecting position/orientation of a helmet according to the invention comprises a particular "optical cube corner". It comprises a prism in the form of a trirectangular trihedron, each of the three plane surfaces of the trihedron comprising a blade with plane and mutually parallel faces, the first face being coincident with the plane surface on which it rests, the interface between this first face and said surface comprising a semi-reflecting treatment.

7 Claims, 5 Drawing Sheets

OPTICAL REFLECTOR HAVING SEMI-REFLECTIVE BLADES FOR A POSITION DETECTION DEVICE FOR A HELMET, AND HELMET COMPRISING SUCH A DEVICE

CROSS-REFERENCE TO RELATED APPLICATIONS

This patent application is a U.S. National Phase Application under 35 U.S.C. §371 of International Application No. PCT/EP2010/068749, filed Dec. 2, 2010, entitled OPTICAL REFLECTOR HAVING SEMI-REFLECTIVE BLADES FOR A POSITION DETECTION DEVICE FOR A HELMET, AND HELMET COMPRISING SUCH A DEVICE, which claims priority to French Patent Application No. 0905866, filed Dec. 4, 2009.

BACKGROUND OF THE INVENTION

1. Field of the Invention

The field of the invention is that of optical devices for detecting the instantaneous position and instantaneous orientation of the helmet worn by an aircraft pilot. In a general manner, a particular position and orientation of the helmet will be called a posture hereinafter in the text. For certain aeronautical applications, pilots' helmets are furnished with viewing devices making it possible to generate, in the pilot's field of view, information relating to piloting, to navigation or to the weapons system. These helmet visual displays are generally coupled to helmet position and orientation detection systems.

2. Description of the Prior Art

There exist various systems making it possible to pinpoint the position of a helmet. Systems relying on the analysis of optical signals representative of the position of the helmet are used in particular. These systems necessarily comprise one or more sources of luminous emission and one or more sources of luminous reception. The emission sources may be luminous sights or point sources of light-emitting diode type, fixed to the helmet in a particular arrangement, such as a triangle. The position of the helmet in a determined zone is then obtained by analysis of the images of the diodes received by cameras from several viewpoints and by geometric calculation; the position of the head in space is deduced. Such devices have been produced by the company Karl Zeiss/Denel. It is possible, conversely, to arrange linear arrays of photo-sensors or photodiodes on the helmet and to illuminate them by projectors of particular images in such a way that the analysis, either spatial or temporal, of the signals received by the various photo-detectors makes it possible to retrieve the helmet posture information.

Whatever procedure is chosen, the detected signal is disturbed by solar illumination. Indeed, a part of the solar illumination is diffused by the helmet toward the reconnaissance cameras. It is known that the solar illumination can reach 70 000 lux in the case of a cockpit canopy having a transmission of 70%. The detected signal becomes hardly utilizable if the solar illumination received by the helmet is significant. When the emission sources are on the helmet, their signal is drowned in solar illumination. When the photo-detectors are on the helmet, the signal received from the source is drowned in solar illumination. The means conventionally used to improve detection consists in providing significant source power. It is also possible to emit and receive in a wavelength span situated outside of the visible solar radiation, that is to say situated either in the infrared, or in the near ultra-violet. However, the levels of solar illumination are still high in the infrared and ultraviolet bands and this type of solution requires specific emission and reception sources which necessarily increase the costs of the detection system.

Another solution is represented in FIG. 1. It consists in arranging on the helmet 1, sights 3 represented by triangles in this figure and comprising at least one first optical element 5 of "catadiopter" type having a very high retro-reflection coefficient and a very low diffusion coefficient in the visible region. The detection device comprises a set of fixed cameras 2 associated with an image processing system. Thus, the solar radiation $R_S$ is necessarily returned toward the sun as may be seen in FIG. 1 and may not reach the detection cameras 2. For night operation, the detection device comprises a set of fixed light sources 6 illuminating the helmet, the catadiopter 5 having a very high retro-reflection coefficient and a very low diffusion coefficient in the region of emission of the source. Opto-mechanical means 61 and 62 making it possible to produce an image of the light source 6 on the optical axis of the camera 2 complete the device. By using several sights 3 appropriately distributed over the helmet and several fixed cameras, it is possible to cover the entire volume of sweep 4 of the helmet.

Generally, any optical reflector or retro-reflector having the property of reflecting a pencil of light in the same direction as its incident direction is called a "catadiopter". There exist diverse optical means of achieving this function. The subsequent description is more particularly concerned with "optical cube corner" catadiopters. An "optical cube corner" 5 such as represented in FIG. 2 consists of three mutually orthogonal plane mirrors 51. Thus, a pencil of light emitted by the emitting part and illuminating the catadiopter 5 is re-emitted in the same direction toward the receiving part with excellent efficiency as seen in FIG. 3. This figure represents the propagation of light rays L issuing from a point source S in an optical cube corner 5. For the sake of clarity, in this figure, the propagation of the rays takes place in a plane parallel to one of the three mirrors constituting the cube. In this plane, the light rays undergo only two reflections on the mirrors 51. It is easily demonstrated that the image of the source S is a source S' situated on an axis SC passing through the source S and the center C of the optical cube corner and at equal distance D from the latter. In the same manner, any light beam which does not issue from the source and which strikes the catadiopter produces, on principle, hardly any illumination directed toward the receiving part.

It is clear that the use of a single catadiopter is insufficient to achieve the helmet's instantaneous position and instantaneous orientation function. It may be shown that this reconnaissance is possible by using, inter alia, a tetrahedron whose four vertices are catadiopters. As an example, a method for recognizing the 2D projection of a tetrahedron is described in European patent EP 0 294 101 from the company EI-Op. In this patent, four sources distributed to the four vertices of a tetrahedron give four image points in the image plane of a camera. On the basis of the knowledge of the projected coordinates of the four points, the position of the tetrahedron in space is calculated, once the indeterminacies have been resolved by discrimination of the points and the elimination of aberrant configurations (four given points on a plane correspond to sixteen possible configurations of tetrahedrons of known geometry but whose orientation is to be determined).

Of course, the dependability of the relative position of the points has a direct impact on the accuracy of the position measurement. Indeed, it may be demonstrated that any defect in the geometry of the tetrahedron either from the outset or due to an alteration in the structure will not only degrade the measurement accuracy but also introduce new ambiguities in the discrimination of the points. As an example, an angular deviation of 0.5 mrad in the position of a point of the tetrahedron gives rise to an error of 1 mrad in the measurement. The rigidity of the support, which guarantees compliance with the relative dimensional coordinates of points, is therefore crucial. It is a definite handicap for systems which, being mounted on the user's head, must remain as lightweight as possible.

SUMMARY OF THE INVENTION

The aim of the device according to the invention is to produce a system for optically detecting position and orientation using particular catadiopters making it possible to generate the detection tetrahedrons by means of a single component. Thus, the device is easily usable in a large range of illuminations, by day with illuminations of the order of 100 000 lux and at night, with illuminations of the order of 0.01 lux, it implements sights in the form of a tetrahedron, making it possible to easily determine the position and the orientation of the helmet in space. This solution also has the advantage of not requiring any electrical power supply for the sights carried by the pilot's helmet, of being particularly simple and robust and of giving high signal/noise ratios whatever the illumination. It is therefore perfectly suited to the environment of aircraft cockpits.

More precisely, the subject of the invention is an optical component for an optical device for detecting position/orientation of a helmet comprising an "optical cube corner", that is to say a trirectangular trihedron of plane surfaces, characterized in that each of the three plane surfaces comprises a plane blade comprising a first face and a second face that are mutually parallel, the first face being coincident with the plane surface on which it rests, the interface between this first face and said surface comprising a semi-reflecting treatment.

Advantageously, the "optical cube corner" is a prism with plane faces made of a transparent material, the semi-reflecting treatment may be identical or different for the three interfaces and the second face of the blades can comprise a reflecting treatment.

The invention also relates to a helmet comprising at least one light-diffusing coating and an optical component such as defined above.

The invention relates finally to an optical device for detecting position/orientation of a helmet, said device comprising at least one fixed camera associated with an image processing system, a fixed light source, opto-mechanical means making it possible to produce an image of the light source on the optical axis of the camera and the helmet carrying at least one optical component such as defined above.

BRIEF DESCRIPTION OF THE DRAWINGS

The invention will be better understood and other advantages will become apparent on reading the nonlimiting description which follows and by way of the appended figures among which.

DETAILED DESCRIPTION

Figure 1:
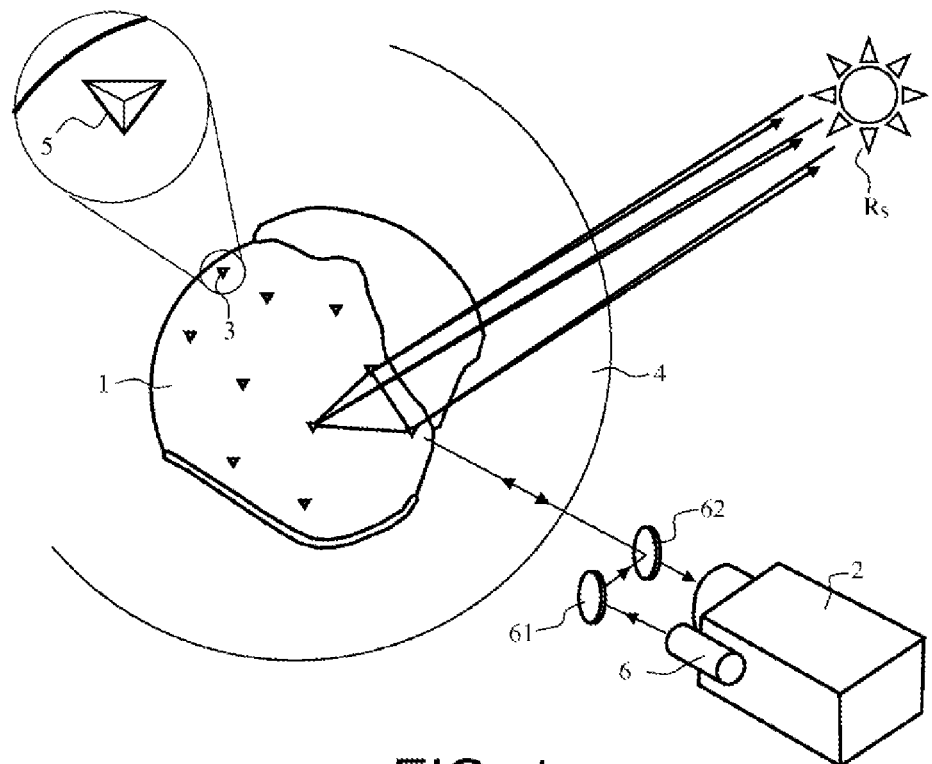
FIG. 1 already commented on represents a detection position system according to the prior art.
Figure 2:
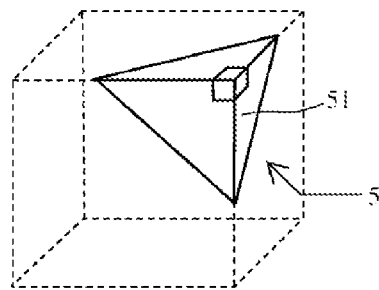
FIG. 2 already commented on represents an optical cube corner according to the prior art.
Figure 3:
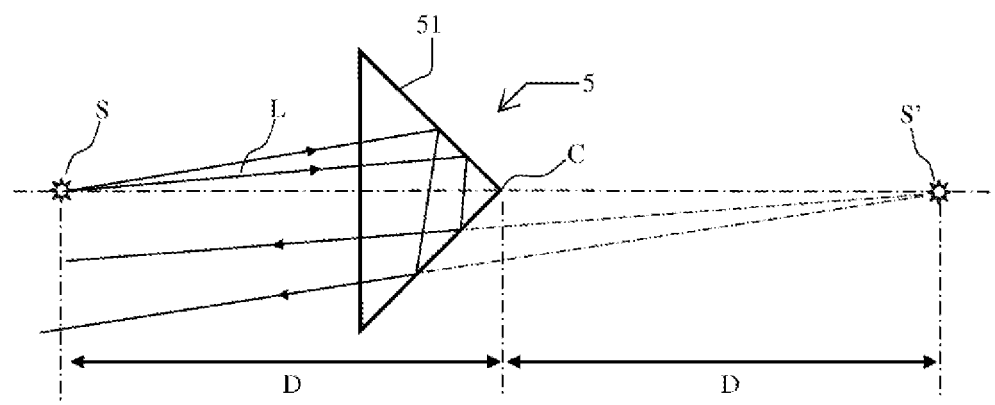
FIG. 3 represents the optical operation of this optical cube corner.
Figure 4:
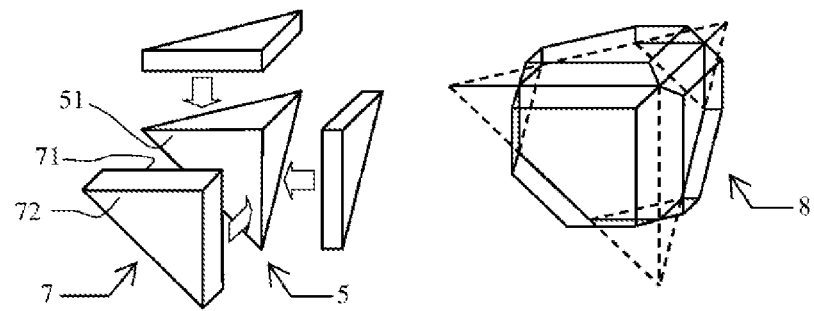
FIG. 4 represents an exploded view and a perspective view of a optical cube corner according to the invention.

Instead of positioning four sources in an accurate manner and imaging them, the component according to the invention creates N virtual images of one and the same source S by way of a particular arrangement represented in the two views of FIG. 4. As seen in the left view of FIG. 4, three blades 7 with plane and parallel faces are arranged on the three plane faces 51 of an optical cube corner 5. The first face 71 of each blade 7 is arranged on a face 51, the interface between this first face 71 and the surface 51 comprising a semi-reflecting treatment. The second face 72 of each blade is reflecting.

The right view of FIG. 4 represents the component 8 according to the invention, once the optical cube corner 5 and the three blades 7 have been assembled and the edges of the optical cube corner folded-down (dashed parts in this view).

Figure 5:
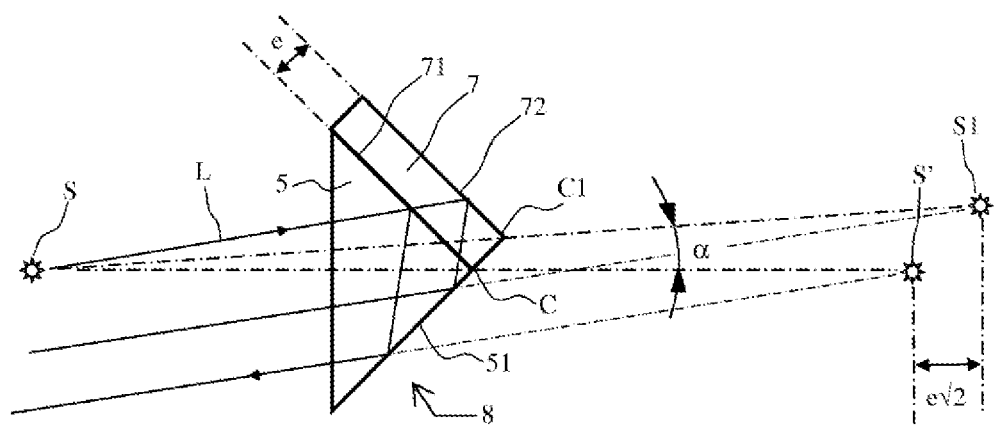
FIG. 5 represents the operating principle of an optical cube corner according to the invention in a plane.
Figure 6:
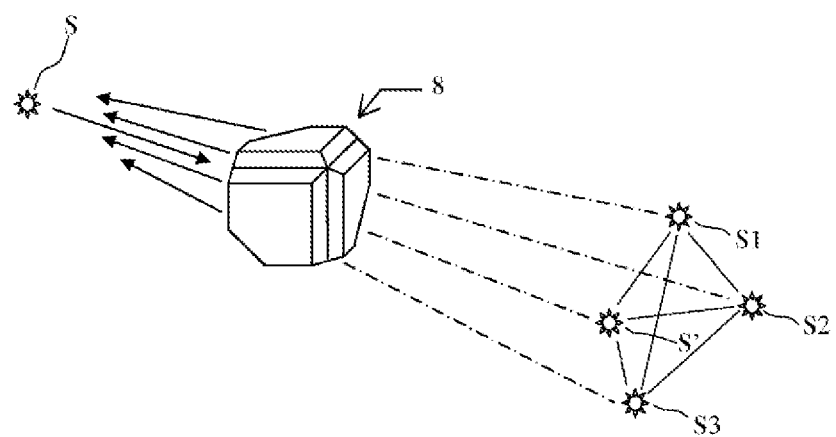
FIG. 6 represents the operating principle of an optical cube corner according to the invention in perspective.

The manner of operation of the optical component according to the invention is described in FIGS. 5 and 6 which represent respectively the image given by the optical cube corner 5 and a single of the three blades 7, and then the image given by the optical cube corner and the three blades together.

In FIG. 5, a point source S is aligned with an axis SC passing through the source and the center of the initial optical cube corner 5. For the clarity of the account, S is considered to be situated in the optical middle of the initial optical cube corner or stated otherwise, the source S is the image of a source $S_0$ not represented in FIG. 5 and situated in the air. The light rays issuing from the source S will therefore be in part reflected by the surface 51 and in part transmitted. The addition of the semi-reflecting blade 7 thus creates a second optical cube corner with vertex C1. As explained previously, the first optical cube corner gives a first image S' of the source S. The second optical cube corner gives a second image S1 of the source S. Under projection along the axis SS', S1 is shifted by twice the shift of CC1 along the same axis, i.e. in total $e.\sqrt{2}$, e being the thickness of the added blade 7.

The angle $\alpha$ at which S1 is seen from S is the same as that at which C1 is seen from S i.e. $e/(SC\sqrt{2})$.

As seen in FIG. 6, by adding a reflecting blade of thickness e to each face of the optical cube corner, three image points S1, S2, and S3 are generated from S. The four points S', S1, S2 and S3 form a tetrahedron in space. From the source S, the central points C1, C2 and C3 are seen at the same angle as the points S1, S2 and S3. The image points S1, S2 and S3 are distributed around S' with an angle of 60° and a constant distance if the three added blades have the same thickness, the image returned by the optical component and formed by the set of points S', S1, S2 and S3 is therefore a virtual tetrahedron which returns the flux issuing from the source S toward itself. This component is therefore optically equivalent to four optical cube corners arranged in a tetrahedron.

Figure 7:
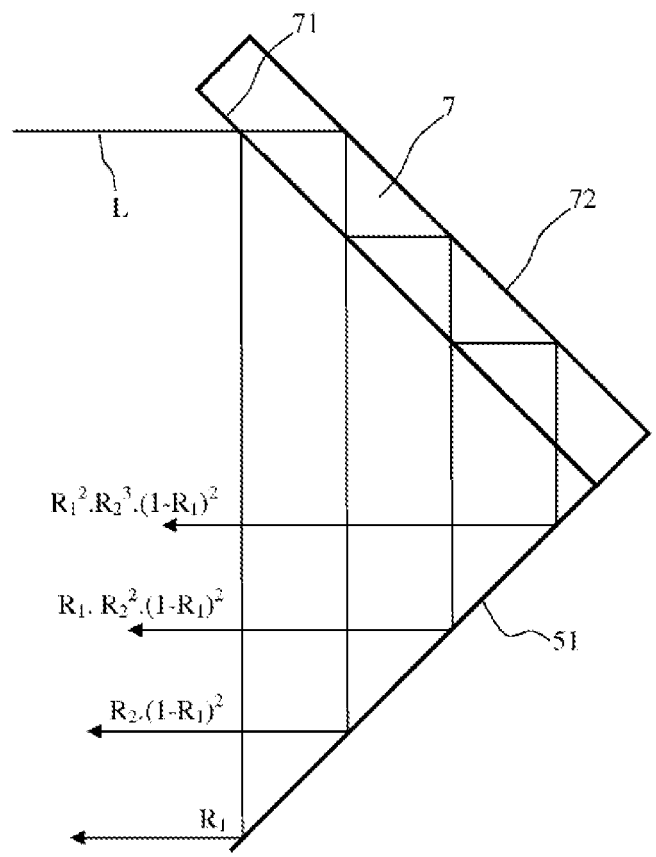
FIG. 7 represents the various images generated in a optical cube corner according to the invention.

As seen in FIG. 7, the semi-reflecting plane blade generates not only the two images S' and S1 but also a plurality of images arising from the multiple reflections between the faces of the blade. In this figure, a single of the three blades is represented. Denoting by $R_1$ and $R_2$ the reflection coefficients of the two faces, it is demonstrated that the reflection coefficients of the various images are successively $R_1$, $R_2.(1-R_1)^2$, $R_1.R_2^2.(1-R_1)^2$, $R_1^2.R_2^3.(1-R_1)^2$, etc. However, only the images S' and S1 have significant reflection coefficients. Moreover, the other images may be utilized insofar as their position is known perfectly. The semi-reflecting treatment may be identical or different for the three interfaces. In the case where the treatment is different for the three interfaces, it is then possible to differentiate the three images S1, S2 and S3 either by their photometric or colorimetric properties.

Figure 8:
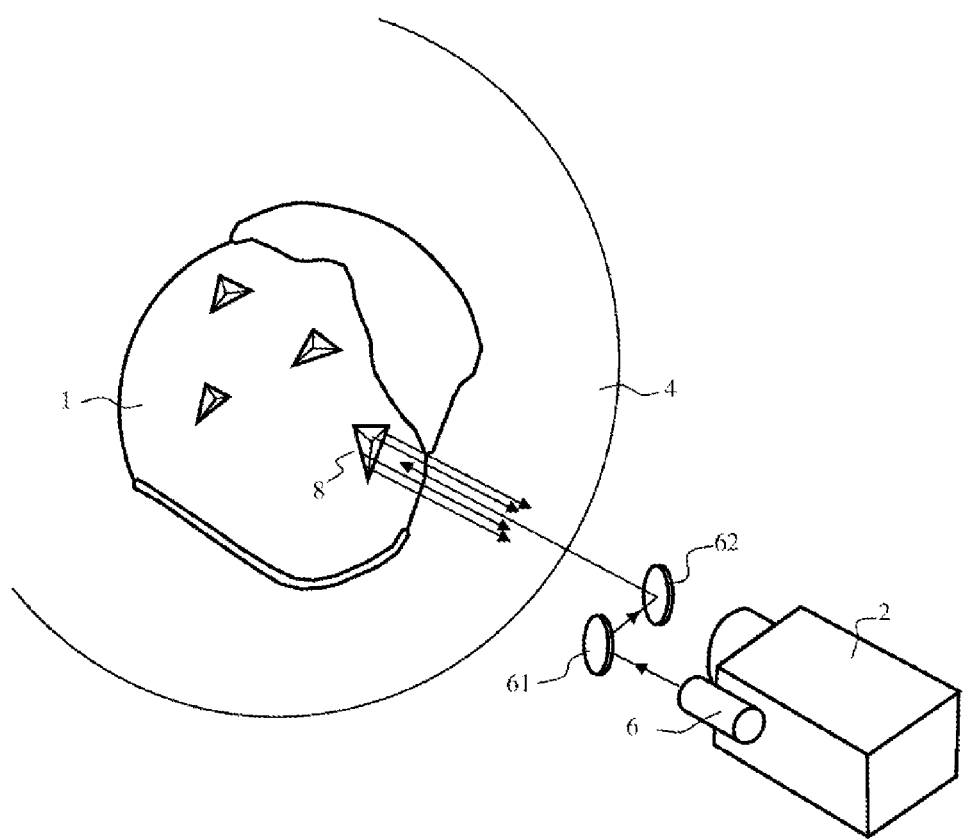
FIG. 8 represents a detection position system according to the invention.

FIG. 8 represents a view of a complete position detection system whose helmet comprises the components 8 according to the invention. As indicated in this figure, the device comprises a helmet 1 worn by a user moving around in a determined zone 4. The device according to the invention is very suitable for operating in an aeronautical environment like an aircraft cockpit. In this case, the user is a pilot. However, this device can be used for any application requiring knowledge of the posture of the users head.

The helmet 1 possesses a matt diffusing coating, advantageously of a light color and comprises a set of components 8. Each component 8 is represented by a tetrahedron in FIG. 8.

The detection of the image quadruplets given by the optical components 8 is ensured by a set of cameras 2. For the sake of clarity, a single camera is represented in FIG. 8. The cameras are arranged in such a way that, whatever the movements of the user's head, a certain number of components 8 is constantly in the field of the cameras. It is generally estimated that three cameras suffice. The cameras may be based on CCD sensors (Charge Coupled Device). The focal length and the aperture of the objective of the cameras must be chosen low enough so that the images of the sources are constantly sharp on the photosensitive surface. The resolution of the camera must be suited to the desired detection accuracy. The sensitivity of the camera must be sufficient for the images given by the sources to be utilizable.

The detection device also comprises one or more fixed light sources 6 distributed in the cockpit and associated with the cameras 2. These sources 6 have an angle of illumination suited to that of the cameras. These sources 6 must operate in the span of sensitivity of the cameras 2. These sources 6 are preferably light-emitting diodes which exhibit the triple advantage of great compactness, great robustness and good reliability.

The detection device comprises opto-mechanical means making it possible to produce an image of each light source 6 on the optical axis of the associated camera. In the case of FIG. 8, these means are simply a mirror 61 and a semi-reflecting blade 62 ensuring the mixing of the two source-camera pathways. In this case, the radiation of the source 6 illuminating the catadioptric component 8 returns to the camera. The catadiopter then gives four images appearing bright on a dark background, symbolized by the four arrows of FIG. 8.

The general arrangements described hereinabove may be afforded a certain number of modifications making it possible to improve detection. Thus, the light source may be temporally modulated; it may be of scan type, it may be slaved so as to illuminate particular zones of the helmet.

The main advantages of this component are:
  The tetrahedron uses the catadioptric and photometric properties of the optical cube corner and makes it possible to return the flux issuing from the source to the source, aligned with the camera, and therefore to the camera, where some other system would introduce a source emission lobe dependency;
  The tetrahedron formed is of very high accuracy. Indeed the optical cube corners and the faces are manufactured with very high accuracies of possibly as much as a second of arc; the thicknesses of the facets may be very regular both in terms of thickness and planarity. Such accuracy cannot be achieved with a real tetrahedron composed of four components or of four mechanically independent sources;
  The tetrahedron formed is monolithic: deformation causes its destruction, thereby making it possible to detect any variation of shape;
  The tetrahedron formed is virtual. It may be situated "in the head of the operator" seen from the camera, thereby allowing much greater latitude in the choice of the position of the optical component;
  The size of the tetrahedron depends only on the distance from the source, and is homothetic thereto; the accuracy obtained is therefore independent of the distance, where the accuracy of a real tetrahedral system would be dependent on proximity to the camera.

What is claimed is:

1. An optical component for an optical device for detecting position/orientation of a helmet comprising an "optical cube corner", that is to say a trirectangular trihedron of plane surfaces, wherein each of the three plane surfaces comprises a plane blade comprising a first face and a second face that are mutually parallel, the first face being coincident with the plane surface on which it rests, the interface between this first face and said surface comprising a semi-reflecting treatment.

2. The optical component as claimed in claim 1, wherein the "optical cube corner" is a prism with plane faces made of a transparent material.

3. The optical component as claimed in claim 1, wherein the semi-reflecting treatment is identical for the three interfaces.

4. The optical component as claimed in claim 1, wherein the semi-reflecting treatment is different for the three interfaces.

5. The optical component as claimed in claim 1, wherein the second face of the blades comprises a reflecting treatment.

6. A helmet for an aircraft pilot comprising at least one light-diffusing coating and an optical component for an optical device for detecting position/orientation of the helmet comprising an "optical cube corner", that is to say a trirectangular trihedron of plane surfaces, wherein each of the three plane surfaces comprises a plane blade comprising a first face and a second face that are mutually parallel, the first face being coincident with the plane surface on which it rests, the interface between this first face and said surface comprising a semi-reflecting treatment.

7. An optical device for detecting position/orientation of a helmet, said device comprising at least one fixed camera associated with an image processing system, a fixed light source, opto-mechanical means making it possible to produce an image of the light source on the optical axis of the camera and the helmet for an aircraft pilot comprising at least one light-diffusing coating and an optical component for an optical device for detecting position/orientation of the helmet comprising an "optical cube corner", that is to say a trirectangular trihedron of plane surfaces, wherein each of the three plane surfaces comprises a plane blade comprising a first face and a second face that are mutually parallel, the first face being coincident with the plane surface on which it rests, the interface between this first face and said surface comprising a semi-reflecting treatment.

* * * * *